(12) United States Patent
Veitch (10) Patent No.: US 7,307,706 B2
(45) Date of Patent: Dec. 11, 2007

(54) OPTICAL TESTING METHOD AND APPARATUS

(75) Inventor: Peter Veitch, Adelaide (AU)

(73) Assignee: The University of Adelaide, Adelaide (AU)

( * ) Notice: Subject to any disclaimer, the term of this patent is extended or adjusted under 35 U.S.C. 154(b) by 464 days.

(21) Appl. No.: 10/512,446

(22) PCT Filed: Apr. 22, 2003

(86) PCT No.: PCT/AU03/00480

§ 371 (c)(1),
(2), (4) Date: Oct. 25, 2004

(87) PCT Pub. No.: WO03/091685

PCT Pub. Date: Nov. 6, 2003

(65) Prior Publication Data

US 2005/0174565 A1    Aug. 11, 2005

(30) Foreign Application Priority Data

Apr. 23, 2002  (AU) ..................................... PS1900

(51) Int. Cl.
*G01B 9/00*  (2006.01)
(52) U.S. Cl. ...................... 356/124; 356/127
(58) Field of Classification Search ......... 356/124–127
See application file for complete search history.

(56) References Cited

U.S. PATENT DOCUMENTS 5,581,347 A   12/1996  Le Saux et al.
6,271,915 B1   8/2001  Frey et al.

FOREIGN PATENT DOCUMENTS

| JP | 2001-108529 | 4/2001 |
|---|---|---|
| WO | 02/24060 A | 3/2002 |

*Primary Examiner*—Gregory J. Toatley, Jr.
*Assistant Examiner*—Amanda H Merlino
(74) *Attorney, Agent, or Firm*—R. Neil Sudol; Henry D. Coleman; William J. Sapone (57) ABSTRACT

Estimating one or more optical characteristics of a Device-Under-Test (DUT). The method, includes directing an optical wavefront, generated by a source, towards a test location and generating at least one ray from the wavefront at the test location. Then for each ray at two or more measurement planes, each measurement plane transverse to the direction of travel of the wavefront and beyond the test location relative to the source at different optical path distances, measuring respective points of intersection of the ray with the measurement planes with and without the DUT at the test location. Followed by determining the transverse aberration due to the DUT for the ray at each measurement plane; and the estimating for each measurement plane from the determined transverse aberrations the coefficients of a general transverse aberration equation, the coefficients of which are the product of a combination of optical characteristics and the optical distance between the measurement plane and the appropriate principal plane of the DUT. The optical characteristics are calculated from the estimates of the coefficients for each measurement plane and the optical distances between respective measurement planes.

42 Claims, 5 Drawing Sheets

OPTICAL TESTING METHOD AND APPARATUS

FIELD OF THE INVENTION

This invention relates to an optical testing method and apparatus. The method and apparatus may be used to determine characteristics of an optical wavefront or of an optical device or system.

It will be appreciated that herein "optic", "optical" or the like, unless the context shows otherwise, is not restricted to visible light. As a person skilled in the art will know, there is a considerable range of the electromagnetic spectrum, including the visible spectrum, that exhibits similar characteristics. In keeping with common parlance of persons skilled in the art this portion of the electromagnetic spectrum may be considered optical in character and falls within the scope of the invention disclosed herein.

It will also be appreciated that whilst lenses will principally be used to explain the invention that the invention is not limited thereto. Rather the invention finds application in optical systems including but not limited to mirrors, prisms, lenses and combinations of the optical devices.

BACKGROUND

The Hartmann technique can be used to characterise an optical wavefront. In previously known implementations of this technique exact knowledge of the distance between the beam-sampling element and the sensor is required to calculate accurately the local slope of the wavefront at the beam-sampling element. The Hartmann technique can also be used to estimate a characteristic of an optical system by comparing the shape of the wavefronts before and after the system and using the distance between one of the cardinal points or planes of the system and the beam-sampler or the sensor as appropriate.

However, the locations of the cardinal points or planes are often unknown and not readily measurable. Inaccurate knowledge of these locations introduces systematic errors in the distance between the cardinal points or planes of the system and the beam-sampler or sensor. This results in an inaccurate map of the optical characteristics of the system or inaccuracies in estimates of the values for optical characteristics.

A practical optic may approximate an ideal optic. Generally there are imperfections with the approximation across the optic. It is desirable to map the imperfections of an optic as indicated by the optical characteristics for the optic. A map may be used to design or check desired performance characteristics for the optic. However, as mentioned, there is typically an error range for the position of the cardinal points or planes which leads to a corresponding error range in the mapped characteristics.

Some previously known methods and techniques for determining the characteristics of an optical wavefront or system are not suited to automated testing. Others have been automated but are complex and require specialised and delicate equipment. Reference in this specification to a document is not to be taken as an admission that the disclosure therein constitutes common general knowledge in Australia.

OBJECT OF THE INVENTION

It is an object of this invention to provide an optical testing method and apparatus to obviate or minimise at least one of the aforementioned problems, or at least provide the public with a useful choice.

SUMMARY OF INVENTION

In a first aspect the invention may be said to reside, not necessarily in the broadest or only form, in a method of estimating one or more optical characteristics of a Device-Under-Test (hereinafter referred to as "DUT"), including the steps of:

directing an optical wavefront, generated by a source, towards a test location;

generating at least one ray from the wavefront;

for each ray:

at two or more measurement planes, each measurement plane transverse to the direction of travel of the wavefront and beyond the test location relative to the source and at different optical path distances, measuring respective points of intersection of the ray with the measurement planes with and without the DUT at the test location;

determining the transverse aberration due to the DUT for the ray at each measurement plane; and, for each measurement plane estimating from the determined transverse aberrations the coefficients of a general transverse aberration equation, the coefficients of which are the product of a combination of optical characteristics and the optical distance between the measurement plane and the appropriate principal plane of the DUT; and, calculating the optical characteristic from the estimates of the coefficients for each measurement plane and the optical distances between respective measurement planes.

It will be appreciated that the DUT may be a single optic or a combination of optical devices that form a system. It will also be appreciated that the optical characteristics of the DUT are determined by measuring its effect on an optical wavefront transmitted through or reflected from the device or system.

It will also be appreciated that the DUT may be a lens, a mirror, a prism or a combination of optics.

The method may be used to produce a map of the optical characteristics of the DUT It may also be used to measure the optical aberrations in the DUT Further, the method may be used to align an optical component and an incident optical wavefront.

It will also be appreciated that the characteristic of the DUT can be determined with reasonable accuracy and precision without knowledge of the distance between the location of the appropriate principal plane of the system and the beam-sampler or the sensor.

It will noted that the cardinal points and the associated cardinal planes may be related to the principal plane. Accordingly, the method and arrangement may, if desired, utilise one or other of these and relate this to the principal plane. In some circumstances it may be preferred to utilise this intermediate step.

Further, it will be appreciated that the method estimates the product of a combination of optical characteristics and the optical distance between the measurement plane and the appropriate principal plane of the DUT, and then makes use of the difference in optical distance between the respective measurement planes to obviate the need to determine the location of the principal plane. Exact knowledge of the location of the principal plane is not required. Alternatively, in situations where the optical distance between the principal plane and one of the measurement planes is known, then the optical distance between the measurement planes may be determined.

In one form the optical characteristic is a coefficient of a general wavefront equation. It will be appreciated that knowledge of the general wavefront equation for an optic allows prediction of the effect of the optic in an optical system. Likewise, an assessment may be made as to whether the optic suits a particular application as could occur where the invention is applied to testing ophthalmic lenses.

In another form, the general transverse aberration equations are derived from the general wavefront equation, and the estimation of coefficients of the general transverse aberration equations involves solving simultaneously equations derived from the general transverse aberration equations.

According to one form, the calculation of the optical characteristic is by subtracting the estimates of the coefficients for each measurement plane from each other and dividing by the respective distance between the planes. Where there are more than two planes, the value for the optical characteristic obtained from different plane pairs may be averaged to provide a composite estimate. Generally, a composite estimate will provide a more accurate indication of the value of the characteristic.

In one form, the step of measuring points of intersection of ray and measurement plane includes:
at a first of the planes:
  determining a first point or first points of the intersection of the ray or each ray with the first plane without the DUT at the test location;
  determining a second point or second points of the intersection of the ray or each ray with the first plane with the D.U.T in the test location; and,
at a second of the planes:
  determining a third point or third points of the intersection of the ray or each ray with the second plane without the DUT at the test location;
  determining a fourth point or fourth points of the intersection of the ray or each ray with the second plane with the D.U.T in the test location.

In one form, the step of determining the transverse aberrations includes
  calculating a first transverse aberration by subtracting the respective first point from the second point; and,
  calculating a second transverse aberration by subtracting the respective third point from the fourth point.

In another form, the step of determining the coefficients of the general transverse aberration equation includes:
  differentiating the general wavefront equation to provide the general transverse aberration equations;
  for the first plane:
    solving the general transverse aberration equations or simultaneous forms of the general transverse aberration equations for the values of the coefficients using the first point, third point and first transverse aberration of respective rays; and,
  for the second plane:
    solving the general transverse aberration equation or simultaneous forms of the general transverse aberration equations for the values of the coefficients using the first point, third point and second transverse aberration of respective rays.

In one form, the step of estimating the optical characteristic includes:
  subtracting respective coefficients for the first and second planes and dividing by the optical path distance between the first and second planes.

In one form the first and second optical path distances are achieved by measuring the ray intersections at two physically spaced transverse planes. The distance between the spaced planes may be readily measured to reasonably high accuracy. In another form, an optical slab of known refractive index and thickness is inserted thereby effecting a known alteration in optical path distance without altering the physical plane where the ray intersections are measured.

In general, for both alternatives the measurements required to determine the difference in the optical path distance between the first and second optical path distances may be conducted to within better than 1% which influences the error range of the values of the optical characteristics estimated.

The optical characteristics of a lens for a ray passing there through at a specific point is constant irrespective of the location of the plane on which the transverse aberration is measured. The transverse aberration is dependant upon the distance to the principal plane which typically is unknown. The method does not require accurate knowledge of the absolute location of the principal plane but rather knowledge of the optical path distance between the first and second planes which as mentioned may be reasonably accurately known or determined.

In one form there are a plurality of rays generated and the method is used to determine a number of coefficients of a general wavefront equation. For each ray the coefficients are determined using adjacent rays to enable the simultaneous solution of a number of equations to determine the values of the coefficients.

In one form, the wavefront equation is composed of a sum of monomials. In another form the wavefront equation is composed of a sum of Zernike polynomials. In other forms, Grant-Schmidt orthogonalisation, such as that outlined in *Optical Shop Testing* by D Malacara, may be used to transform the wavefront equation into one composed of a sum of polynomials that are orthogonal over the data set.

In another form, regression analysis is used to estimate the coefficients in the wavefront equation. Least squares estimation is an example. Alternatively a grid search, a gradient search or a ravine search such as outlined in *Data Reduction and Error Analysis for the Physical Sciences* by P. R. Bevington, may be used. In yet a further form, a genetic algorithm might be used to establish the best estimate of the coefficients.

In a second aspect the invention may be said to reside, again not necessarily in the broadest or only form, in an apparatus for estimating an optical characteristic of a Device-Under-Test (hereinafter referred to as "DUT"), including:
  means for directing an optical wavefront, generated by a source, towards a test location;
  ray generation means for generating at least one ray from the wavefront;
  detector means for measuring respective points of intersection of each ray at two of more measurement planes with and without the DUT at the test location, each plane being transverse to the direction of travel of the wavefront, beyond the test location relative to the source, and at different optical path distances; and,
  processing means for calculating the transverse aberration due to the DUT for each ray at each plane, estimating for each plane from the determined transverse aberrations the coefficients of a general transverse aberration equation, the coefficients of which are the product of a combination of optical characteristics and optical distance between the plane and the principal plane of the DUT, and estimating the optical characteristic from the estimates of the coefficients for each plane and the optical distances between respective planes.

According to one form the detector means includes a charge coupled device (CCD) camera which is locatable at the measurement planes. The detector means may take other forms including scanning detectors.

In another form, the detector means is a screen, typically an optically translucent screen, upon which the rays may be projected and is locatable at the measurement planes. The displayed image on the screen may be imaged onto a CCD camera.

In one form the processing means is a computer including interface means for communication with the CCD camera, memory means for storing data and instructions, and output means for provision of results. In one form the output means is a video display or alternatively is a printer or plotter.

In one form, the ray generation means includes a Hartmann plate. A Hartmann plate may have the apertures in various patterns including square two dimensional array, and hexagonal two dimensional array. In an alternative form, the ray generation means includes a movable or scannable aperture such as a spatial light modulator.

In one form, the ray generation means is located between the light source and the DUT Alternatively, the ray generation means may be located between the DUT and the detector means.

According to one form, the detector means includes means for selective placement of a transparent optical slab of known properties between the DUT and the camera to thereby produce the optical path difference between the measurement planes. In such a form the physical location of the measurement planes are coincident but the optical path distance is altered. In another form, a beam splitter is used to split each ray into at least two and there are two detector means, such as cameras, at different measurement planes to detect the split rays.

In one form, other optics of known characteristics may be used to ensure the rays fall within the field of view of the detector means. Such optics may include lenses or mirrors which either converge or diverge the rays. For example, CCD cameras currently have a relatively small lateral extent whilst maintaining a reasonable resolution and so by use of converging or de-magnifying optics the rays fall within the detectable region of the camera. In other situations, it may be desired to diverge the rays in a known manner to improve the effective resolution with which the intersection points may be determined.

To assist in the understanding of the invention preferred embodiments will now be described with reference to the accompanying drawings.

It will be appreciated that the figures are not engineering design drawings but only sketches for the purpose of assisting in explanation of the invention. Accordingly, features, perspective, proportions or the like may be inaccurate, and features may have been omitted.

The preferred embodiment utilises cartesian co-ordinates but it will be appreciated that other co-ordinate systems may be used. Further, in this embodiment the source wavefront is collimated but it will be appreciated that this is not essential.

A general wavefront equation in terms of Spherical Power (S), Cylindrical Power (C), Prism (P), Spherical Aberration (A) and Coma (B) coefficients may be written as:

$$W = P(x\cos\alpha + y\sin\alpha) + 0.5S(x^2+y^2) + 0.5C(x\sin\phi - y\cos\phi)^2 + A(x^2+y^2)^2 + B(x\cos\beta + y\sin\beta)(x^2+y^2)$$

where:
x, y are the transverse coordinates of the beams at the first principal plane of the D.U.T if the ray generation means is placed between the light source and the DUT;
$\alpha$ is the orientation of the prism;
$\beta$ is the orientation of the coma; and
$\phi$ is the orientation of the cylinder.

Transverse Aberration (TA) in cartesian co-ordinates is:

$$TA_x = -l\frac{\partial W}{\partial x} \quad TA_y = -l\frac{\partial W}{\partial y}$$

where l is the distance from the principal plane of the optic to the measurement plane if the ray generation means is placed between the light source and the DUT.

The transverse aberrations may be written as:

$$TA_x = a_0 + a_1 x + a_2 y + 2a_3 xy + 3a_4 x^2 + a_4 y^2 + a_5 x^3 + a_5 xy^2$$

$$TA_y = a_6 + a_2 x + a_7 y + 2a_4 xy + a_3 x^2 + 3a_3 y^2 + a_5 y^3 + a_5 x^2 y$$

where the coefficients $a_0, \ldots a_7$ may be written as:

$a_0 = -lP \cos\alpha$
$a_1 = -l(S + C \sin^2\phi)$
$a_2 = -l(-C \sin\phi \cos\phi)$
$a_3 = -lB \sin\beta$
$a_4 = -lB \cos\beta$
$a_5 = -l4A$
$a_6 = -lP \sin\alpha$
$a_7 = -l(S + C \cos^2\phi)$ A least square measure for a number of rays may be written as:

$$\chi^2 = \sum_i \left| \{TA_{x_i} + jTA_{y_i}\} - \left\{ \begin{pmatrix} a_0 + a_1 x_i + a_2 y_i + 2a_3 x_i y_i + \\ 3a_4 x_i^2 + a_4 y_i^2 + a_5 x_i^3 + a_5 x_i y_i^2 \end{pmatrix} + j\begin{pmatrix} a_6 + a_2 x_i + a_7 y_i + 2a_4 x_i y_i + \\ a_3 x_i^2 + 3a_3 y_i^2 + a_5 y_i^3 + a_5 x_i^2 y_i \end{pmatrix} \right\} \right|^2$$

-continued $$= \sum_i \left\{ \begin{array}{l} \left[TA_{x_i} - \begin{pmatrix} a_0 + a_1 x_i + a_2 y_i + 2a_3 x_i y_i + \\ 3a_4 x_i^2 + a_4 y_i^2 + a_5 x_i^3 + a_5 x_i y_i^2 \end{pmatrix}\right]^2 \\ - \left[TA_{y_i} - \begin{pmatrix} a_6 + a_2 x_i + a_7 y_i + 2a_4 x_i y_i + \\ a_3 x_i^2 + 3a_3 y_i^2 + a_5 y_i^3 + a_5 x_i^2 y_i \end{pmatrix}\right]^2 \end{array} \right\}$$

and by differentiating $x^2$ with respect to each coefficient and setting to equal zero, $a_0 \ldots a_7$ may be solved:

$$\frac{\partial \chi^2}{\partial a_0} = \sum_i \alpha_i = 0$$

$$\frac{\partial \chi^2}{\partial a_1} = \sum_i \alpha_i x_i = 0$$

$$\frac{\partial \chi^2}{\partial a_2} = \sum_i (\alpha_i y_i + \beta_i x_i) = 0$$

$$\frac{\partial \chi^2}{\partial a_3} = \sum_i (\alpha_i 2 x_i y_i + \beta_i (x_i^2 + 3 y_i^2)) = 0$$

$$\frac{\partial \chi^2}{\partial a_4} = \sum_i (\alpha_i (3 x_i^2 + y_i^2) + \beta_i 2 x_i y_i) = 0$$

$$\frac{\partial \chi^2}{\partial a_5} = \sum_i (\alpha_i (x_i^3 + x_i y_i^2) + \beta_i (y_i^3 + x_i^2 y_i)) = 0$$

$$\frac{\partial \chi^2}{\partial a_6} = \sum_i \beta_i = 0$$

$$\frac{\partial \chi^2}{\partial a_7} = \sum_i \beta_i y_i = 0$$

where:

$$\alpha_i = TA_{x_i} - \begin{pmatrix} a_0 + a_1 x_i + a_2 y_i + 2a_3 x_i y_i + \\ 3a_4 x_i^2 + a_4 y_i^2 + a_5 x_i^3 + a_5 x_i y_i^2 \end{pmatrix}$$

$$\beta_i = TA_{y_i} - \begin{pmatrix} a_6 + a_2 x_i + a_7 y_i + 2a_4 x_i y_i + \\ a_3 x_i^2 + 3a_3 y_i^2 + a_5 y_i^3 + a_5 x_i^2 y_i \end{pmatrix}$$

Having determined $a_0 \ldots a_7$, the combined characteristic/distance parameters, being combinations of optical characteristics and optical distance between the measurement plane and the principal plane, may be calculated. The transverse aberration is dependant upon the distance from the principal plane to the measurement plane. This distance is unknown so characteristic/distance parameters are calculated being respectively Spherical Power (S), Cylindrical Power (C), Prism (P), Spherical Aberration (A) and Coma (B) characteristics multiplied by the distance to the principal plane as follows:

$$Pl = \sqrt{(a_0^2 + a_6^2)}$$

$$\tan\alpha = \frac{a_6}{a_0}$$

$$\tan 2\phi = \frac{2a_2}{(a_1 - a_7)}$$

$$Cl = \frac{(a_1 - a_7)}{\cos 2\phi}$$

-continued $$Sl = -\frac{(a_1 + a_7 - Cl)}{2}$$

$$Al = -\frac{a_5}{4}$$

$$Bl = \sqrt{(a_3^2 + a_4^2)}$$

$$\tan\beta = \frac{a_3}{a_4}$$

Repeating the above process for a second measurement plane being a second distance from the principal plane, a second set of characteristic/distance parameters may be calculated. The value of Spherical Power (S), Cylindrical Power (C), Prism (P), Spherical Aberration (A) and Coma (B) coefficients remain constant hence by knowing the distance between the two measurement planes ($\delta 1$) the values of these coefficients may be calculated as follows:

$$S = \frac{(Sl_2 - Sl_1)}{\delta l}$$

$$C = \frac{(Cl_2 - Cl_1)}{\delta l}$$

$$P = \frac{(Pl_2 - Pl_1)}{\delta l}$$

$$A = \frac{(Al_2 - Al_1)}{\delta l}$$

$$B = \frac{(Bl_2 - Bl_1)}{\delta l}$$

The orientation angles $\alpha$, $\phi$ and $\beta$ should be approximately the same and may be averaged.

The back vertex power ($S_{bv}$) may be calculated provided the distance from the back vertex of the lens to one of the measurement planes is known. If this is known for the first measurement plane ($l_{bv}$) then:

$$S_{bv} = \frac{1}{\xi_{bv}}$$

where:

$$\xi_{bv} = l_{bv} + \frac{(1 - Sl_1)}{S}$$

Figures 1, 2:
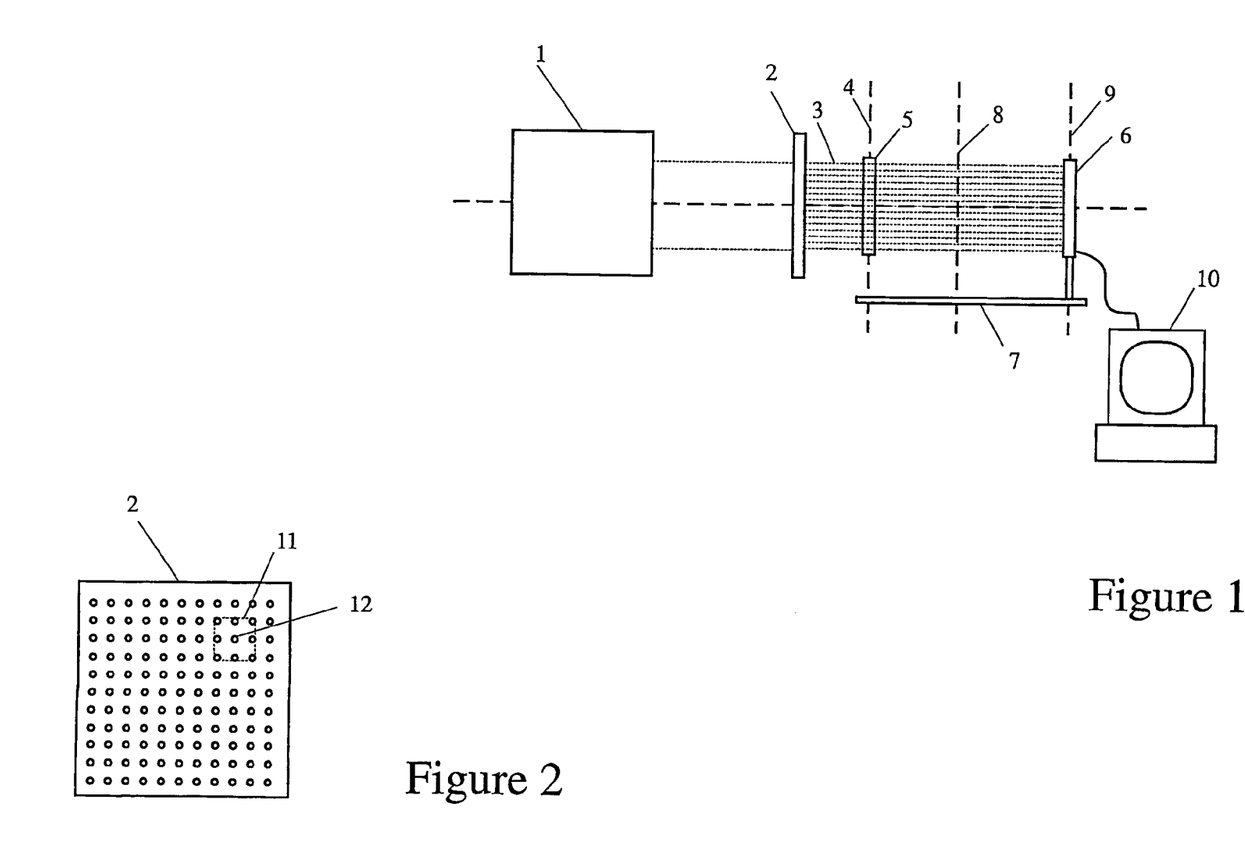
FIG. 1 is a schematic sketch of a first embodiment.
FIG. 2 is a schematic sketch of the Hartmann plate.

Referring to FIG. 1. The embodiment may be used to estimate the value of the optical characteristic including Spherical Power (S), Cylindrical Power (C), Prism (P), Spherical Aberration (A) and Coma (B) and the orientations ($\alpha$, $\phi$ and $\beta$) of a Device-Under-Test (DUT). There are ray generating means comprising a light source (1) and a Hartmann plate (2). The light source preferably provides collimated wavefront which simplifies the calculations and makes calibration and system checking easier but is not strictly necessary. The optimum diameter of the holes in the Hartmann plate and the minimum spacing of the holes are determined by the expected characteristics of the DUT, the required precision of the results and the required spatial resolution of the map. As an example, a Hartmann plate that as a hole diameter of 0.5 mm and a hole spacing of 0.8 mm could be used to characterise a lens with spherical power of 2 dioptre. The pattern of the holes is in this example straight rows and columns as seen in FIG. 2 but may take other forms as desired including where each hole is equidistant from neighbouring holes or where holes are closer together in, for example the centre of the Hartmann plate and wider spacing toward the periphery of the Hartmann plate. The pattern of the holes does not need to be precisely fabricated as the hole positions are determined from the measured data.

The rays (3) are directed towards a test location (4) where a DUT (5) may be placed. Ray location determining means (6) which may be a CCD camera of 2048×2048 or 1024× 1024 pixels mounted to a rail (7) is placed a first optical path distance (8) from the test location. The camera has a plane transverse and preferably but not necessarily perpendicular to the direction of travel of the wavefront. Here the first locations of the intersection of the rays with a first plane are measured without the D.U.T in the test location. The ith ray of the first locations is designated as $(x_1,y_1)_i$.

The DUT is placed at the test location and second locations of intersections of the rays with the plane of the camera are measured. The ith ray of the second locations is designated as $(x_2,y_2)_i$.

The camera is moved along the rail away from the test location to a second optical path distance (9). The distance between the first and second optical path distances is accurately measured or adjusted. The plane of the camera at the second optical path distance is a second plane and is preferably parallel to the first plane. Here third locations of the intersection of the rays are measured using the camera with the DUT removed. The ith ray of the third locations is designated as $(x_3,y_3)_i$. With the DUT placed at the test location fourth locations of the intersection of the rays are measured using the camera. The ith ray of the fourth locations is designated as $(x_4,y_4)_i$.

An alternative to physically moving the camera to change the optical path distance is to place a slab optic with known thickness and refractive index between the DUT and the camera. The slab has a known optical path thickness to effect a change to a second optical path distance.

A calculation means (10) such as a computer suitably coupled to the camera performs a number of calculations using the measured locations for the ray intersections. The non peripheral rays are repeatedly divided into subsets of a central ith ray and its closest neighbours (one subset (11) being illustrated in FIG. 2). Each subset is designated by $s_i$ where i refers to the central ray (one being illustrated in FIG. 2 as (12)) and the rays of this subset are designated j=1 to 9.

For each subset $s_i$ the ray locations without the DUT in the test location are made relative to the central ray being the ith ray. For the first optical path distance:

$$(x_r,y_r)_{j(1)}=(x_1,y_1)_j-(x_1,y_1)_i$$

and for the second optical path distance:

$$(x_r,y_r)_{j(2)}=(x_3,y_3)_j-(x_3,y_3)_i$$

If the wavefront is incident on the Hartmann plate is sufficiently well collimated then $(x_r,y_r)_{j(1)}$ for the first optical path distance will be the same as $(x_r,y_r)_{j(2)}$ for the second optical path distance and is equal to the relative ray positions at the first principal plane of the DUT Otherwise the relative ray positions at the first principal plane of the DUT are calculated by extrapolation.

The computer calculates the transverse aberrations for each subset at the first optical path distance:

$$(TA_x,TA_y)_{j(1)}=(x_2,y_2)_j-(x_1,y_1)_j$$

This is repeated for the second optical path distance:

$$(TA_x,TA_y)_{j(2)}=(x_4,y_4)_j-(x_3,y_3)_j$$

For each optical path distance and for each ith subset the $a_0 \ldots a_7$ coefficients are calculated as explained above. In this embodiment due to relating each ray to ith ray the equations that need to be simultaneously solved are:

$$\frac{\partial \chi^2}{\partial a_0} = \sum_j \alpha_j = 0$$

$$\frac{\partial \chi^2}{\partial a_1} = \sum_j \alpha_j x_{r_j} = 0$$

$$\frac{\partial \chi^2}{\partial a_2} = \sum_j (\alpha_j y_{r_j} + \beta_j x_{r_j}) = 0$$

$$\frac{\partial \chi^2}{\partial a_3} = \sum_j (\alpha_j 2 x_{r_j} y_{r_j} + \beta_j (x_{r_j}^2 + 3 y_{r_j}^2)) = 0$$

$$\frac{\partial \chi^2}{\partial a_4} = \sum_j (\alpha_j (3 x_{r_j}^2 + y_{r_j}^2) + \beta_j 2 x_{r_j} y_{r_j}) = 0$$

$$\frac{\partial \chi^2}{\partial a_5} = \sum_j (\alpha_j (x_{r_j}^3 + x_{r_j} y_{r_j}^2) + \beta_j (y_{r_j}^3 + x_{r_j}^2 y_{r_j})) = 0$$

$$\frac{\partial \chi^2}{\partial a_6} = \sum_j \beta_j = 0$$

$$\frac{\partial \chi^2}{\partial a_7} = \sum_j \beta_j y_{r_j} = 0$$

where $$\alpha_j = TA_{x_j} - \begin{pmatrix} a_0 + a_1 x_{r_j} + a_2 y_{r_j} + 2 a_3 x_{r_j} y_{r_j} + \\ 3 a_4 x_{r_j}^2 + a_4 y_{r_j}^2 + a_5 x_{r_j}^3 + a_5 x_{r_j} y_{r_j}^2 \end{pmatrix}$$

$$\beta_j = TA_{x_j} - \begin{pmatrix} a_6 + a_2 x_{r_j} + a_7 y_{r_j} + 2 a_4 x_{r_j} y_{r_j} + \\ a_3 x_{r_j}^2 + 3 a_3 y_{r_j}^2 + a_5 y_{r_j}^3 + a_5 x_{r_j}^2 y_{r_j} \end{pmatrix}$$

Then the characteristic/distance parameters are calculated using the equations mentioned above for each ray and at both the first and second optical path distances. Subsequently the value of Spherical Power (S), Cylindrical Power (C), Prism (P), Spherical Aberration (A) and Coma (B) coefficients and their orientation may be calculated using the equations mentioned above for each ray.

As the value of Spherical Power (S), Cylindrical Power (C), Prism (P), Spherical Aberration (A) and Coma (B) coefficients are provided in terms of each ray it is possible to utilise this to display a map of the optical characteristics of the DUT.

In a second embodiment the DUT is an optic of known characteristics (P, S, C, A and B for example). A slab optic of known physical thickness $l_p$ but unknown refractive index n is used to produce the change in optical path distance. Then by proceeding as for the first embodiment the refractive index may be determined using any one or more of:

$$n = \frac{(Sl_2 - Sl_2)}{Sl_p} + 1$$

$$n = \frac{(Cl_2 - Cl_2)}{Cl_p} + 1$$

$$n = \frac{(Pl_2 - Pl_2)}{Pl_p} + 1$$

-continued $$n = \frac{(Al_2 - Al_2)}{Al_p} + 1$$

$$n = \frac{(Bl_2 - Bl_2)}{Bl_p} + 1$$

It will be appreciated that only one optical property (S, C, P, A or B) need be known to estimate the refractive index n. However, if more optical properties are known then the estimates could be averaged.

Figures 3, 4:
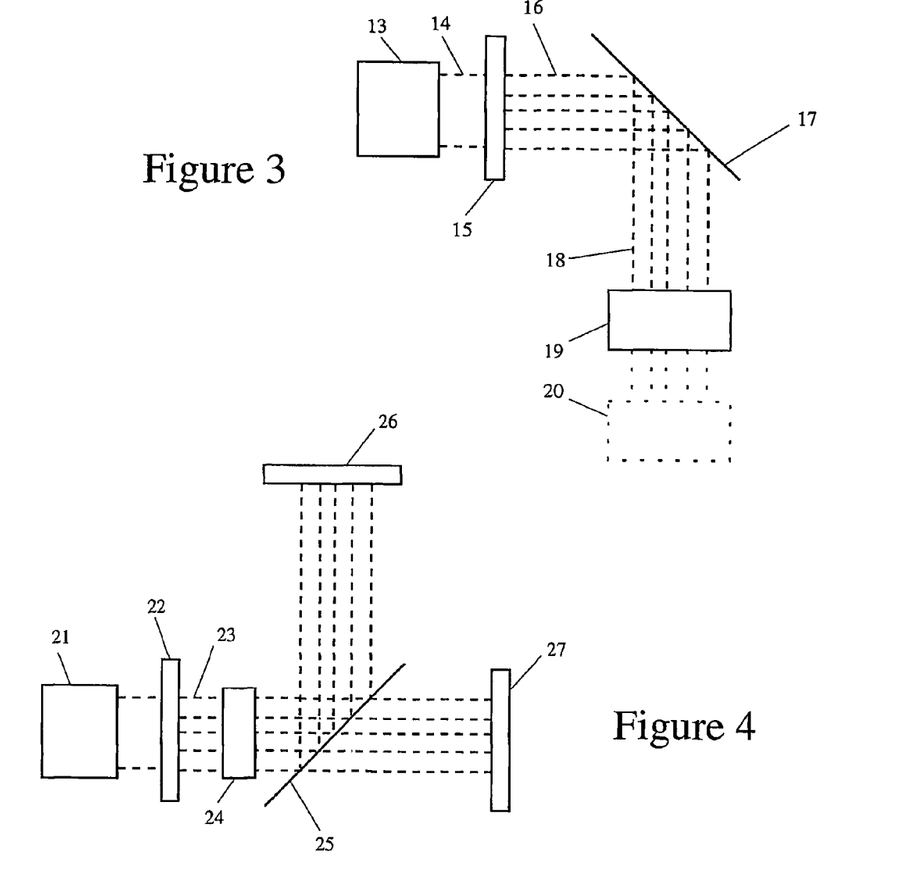
FIG. 3 is a schematic sketch of testing a mirror.
FIG. 4 is a schematic sketch of testing an optic with two cameras.

Referring to FIG. 3, the light source (13) produces a wavefront (14) from which Hartmann plate (15) generates a plurality of rays (one shown as 16). The rays are directed to either a flat mirror (17) at the test location or a reflective optic at the test location. The reflected rays (one shown as 18) are directed to a CCD camera at a first measurement plane (19) and at a second measurement plane (20). The ray intersections with the planes as measured by the camera are processed as described above.

In FIG. 4 a light source (21) directs a wavefront onto a scannable aperture (22) which produces a plurality of rays (one shown as 23). The rays pass through the test location with or without the DUT (24) in place and strike beam splitter (25). The rays are then split into two components which are detected by first and second cameras (26 and 27) respectively. The cameras are at different optical path distances from the beam splitter. This arrangement does not require the camera to be moved but does require the use of two cameras. The cameras are calibrated to the system. Calibration of the system need only be done once and may be accomplished a number of ways. One way is to place an optic of known optical characteristic and then determine the optical path difference. Alternatively, an optic, whether of known or unknown characteristics, is used and one camera is moved until both cameras produce the same value for the characteristic/distance parameter and thereby the optical path difference is zeroed. Then one camera is moved a known optical path distance to thereby provide a known optical path difference for the system. It will be appreciated that without the DUT the rays are readily identified and hence their positions determined by the cameras can be related.

Figure 5:
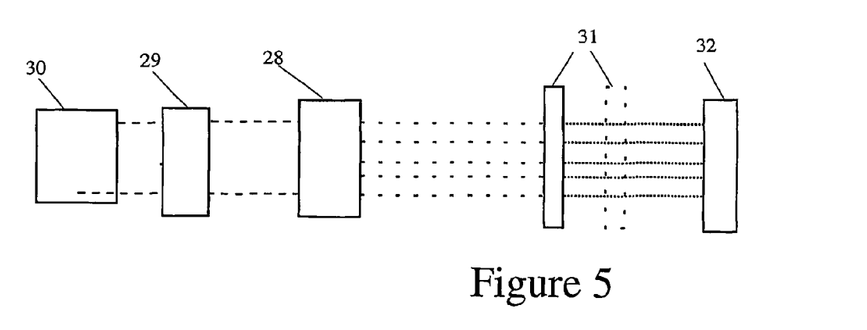
FIG. 5 is a schematic sketch of where the Hartmann plate is placed after the test location.

In FIG. 5 a similar arrangement to that of FIG. 1 is shown. The difference is that the Hartmann plate (28) placed after but close to the test location (29). The light source (30) directs a wavefront towards the test location and through the DUT when there placed. This figure also shows how a translucent screen (31) can be used as the detector. The screen is placed at one of two locations as illustrated and the CCD camera (32) is focused onto the screen at its two positions. The movement of the screen provides the different optical path distances between the two planes. The detected ray intercepts are processed as described above.

Figure 6:
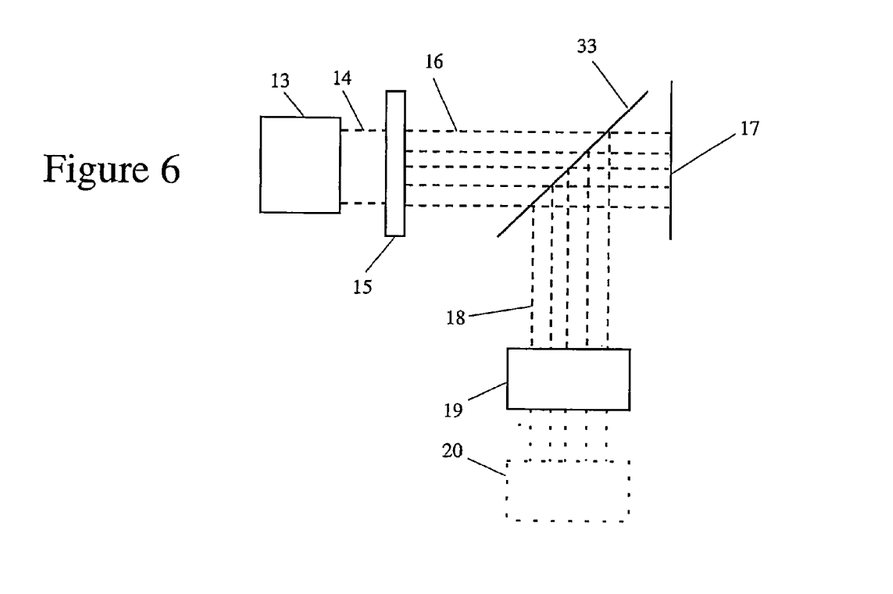
FIG. 6 is a schematic sketch of testing a mirror.

In FIG. 6 a further scheme for testing a mirror (17) is illustrated. This is similar to that discussed with reference to FIG. 3 except that a beam splitter (33) is used to separate the incident and reflected beams.

Figure 7:
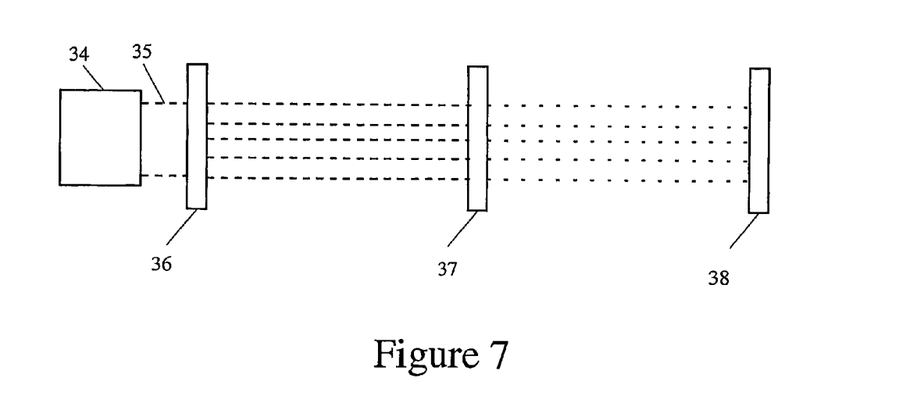
FIG. 7 is a schematic sketch of testing a wavefront.

FIG. 7 illustrates a scheme for determining the characteristics of an optical wavefront. A light source (34) generates a wavefront (35) that is converted into a plurality of rays by Hartmann plate (36). The rays are measured at the measurement planes (37 and 38) and processed as before. In this case the hole positions of the Hartmann plate are predetermined. This may be done by using a diffraction limited, collimated laser beam and placing a CCD camera close to the Hartmann plate. This need only be done once with the hole positions being recorded. The transverse aberrations at each measurement plane are measured and then processed to determine the characteristics of the wavefront under test.

Figure 8:
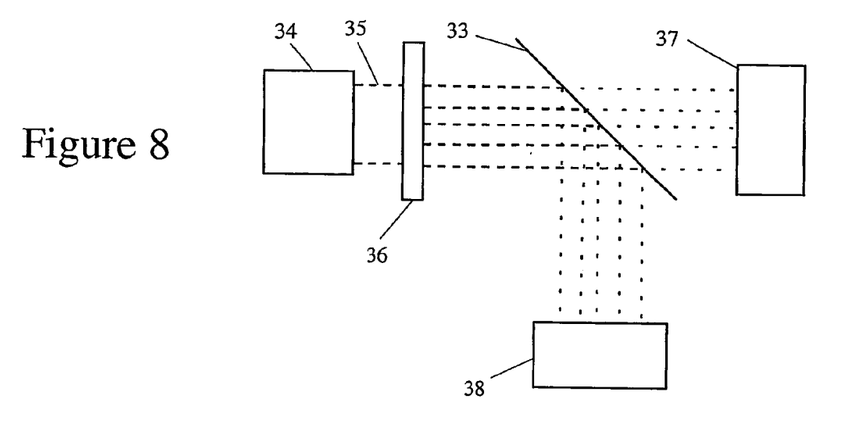
FIG. 8 is a schematic sketch of testing a wavefront with two cameras.

FIG. 8 illustrates an alternative scheme for determining the characteristics of an optical wavefront. A light source (34) generates a wavefront (35) that is converted into a plurality of rays by Hartmann plate (36). The rays strike beam splitter (33) and are split into two components which are detected by first and second cameras (37 and 38) respectively. The cameras are at different optical path distances from the beam splitter. This arrangement does not require the camera to be moved but does require the use of two cameras. The average characteristics of the wavefront can be determined by using all of the points of intersection rather than subsets of them.

Figure 9:
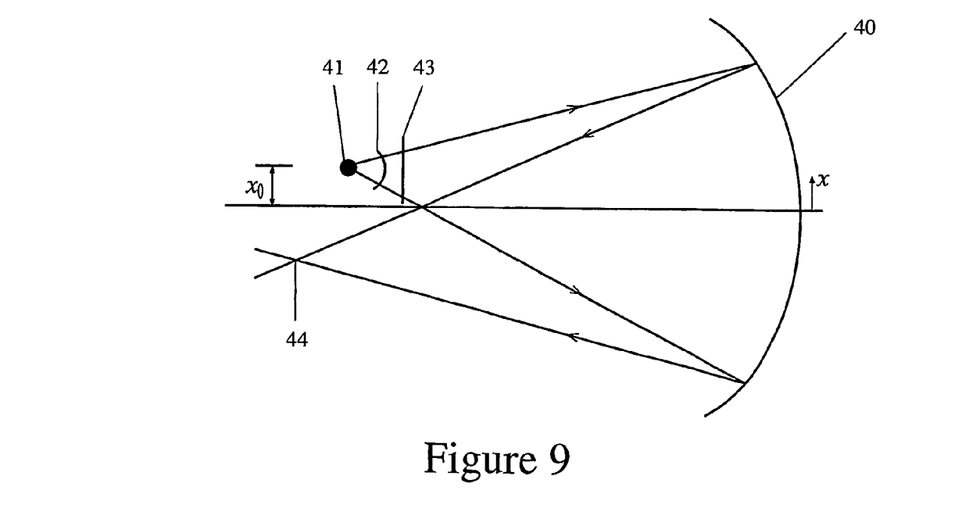
FIG. 9 is a schematic sketch of a scheme for determining the characteristics of a concave mirror.

FIG. 9 illustrates a scheme for determining the characteristics of a concave mirror (40). A point light source (41) generates a wavefront (42) that is converted into a plurality of rays by a relatively small Hartmann plate (43). The coordinates of the rays at the mirror surface are estimated using the geometry of the layout. The intersections of the reflected rays with two or more planes located near the focus (44) are measured as previously described. The characteristics of the mirror are determined using $$\Delta x = x_2 - x_1 = \delta l\left(\frac{x - x_0}{R}\right) - \delta l \frac{\partial W}{\partial x} \text{ and } \Delta y = y_2 - y_1 = \delta l\left(\frac{y - y_0}{R}\right) - \delta l \frac{\partial W}{\partial y}$$

where $\Delta x$ and $\Delta y$ are the differences between the points of intersection ($x_1$ and $x_2$, $y_1$ and $y_2$) of a ray at a pair of measurement planes, $\delta l$ is the optical distance between the measurement planes, R is the radius of curvature of the source wavefront at the mirror.

Figure 10:
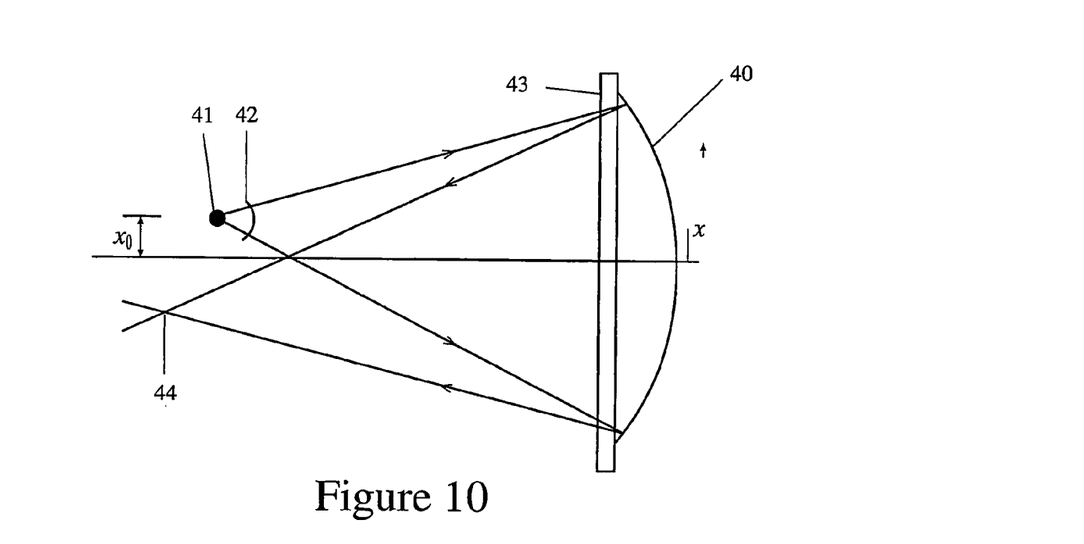
FIG. 10 is a schematic sketch of a further scheme for determining the characteristics of a concave mirror; and,
FIG. 11 is a contour map of the spherical power, in dioptres, of part of a nominally high quality microscope objective lens.

In FIG. 10 a further scheme for testing a concave mirror (40) is illustrated. This is similar to that discussed with reference to FIG. 9 except that the Hartmann plate (43) is located near the mirror and thus the coordinates of the ray at the mirror can be determined from the Hartmann plate directly.

EXAMPLE

Contour Map of an Objective Lens

Figure 11:
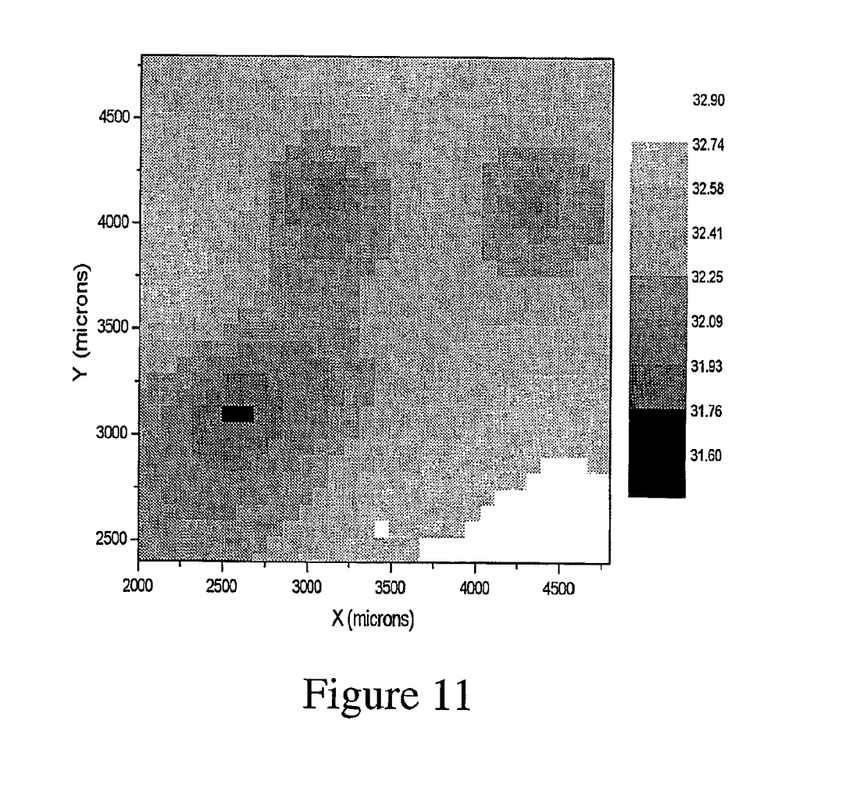

A contour map of the spherical power, in dioptres, of part of a nominally high quality microscope objective lens is shown in FIG. 11. The contour map was generated from 17 estimates of the spherical power at different points on the lens. Each measurement has a reproducibility of 0.03 dioptre.

It will be appreciated that whilst the preferred embodiment centres each ray subset on a ray this is not essential. Each subset may be centred between rays if desired.

The invention claimed is:

1. A method of estimating one or more optical characteristics of a Device-Under-Test (DUT), including the steps of:
   directing an optical wavefront, generated by a source, towards a test location;
   generating at least one ray from the wavefront at the test location;
   for each ray:

at two or more measurement planes, each measurement plane transverse to the direction of travel of the wavefront and beyond the test location relative to the source and at different optical path distances, measuring respective points of intersection of the ray with the measurement planes with and without the DUT at the test location;

determining the transverse aberration due to the DUT for the ray at each measurement plane; and, for each measurement plane estimating from the determined transverse aberrations the coefficients of a general transverse aberration equation, the coefficients of which are the product of a combination of optical characteristics and the optical distance between the measurement plane and the appropriate principal plane of the DUT;

calculating the one or more optical characteristics from the estimates of the coefficients for each measurement plane and the optical distances between respective measurement planes; and one of the steps selected from the group consisting of: plotting the calculated optical characteristics as a map, aligning the DUT and an incident optical wavefront, and adjusting one of the optical characteristics of the DUT.

2. A method of estimating one or more optical characteristics of a DUT as in claim 1 wherein cardinal points and the associated cardinal planes are related to the principal plane of the DUT and wherein either the cardinal points or the cardinal planes are used to ascertain the principal plane.

3. A method of estimating one or more optical characteristics of a DUT as in claim 1 including estimating the product of a combination of optical characteristics and the optical distance between the measurement plane and the appropriate principal plane of the DUT, and then using the difference in optical distance between the respective measurement planes to ascertain the principal plane.

4. A method of estimating one or more optical characteristics of a DUT as in claim 1 wherein the optical distance between the principal plane and one of the measurement planes is known, the method including the step of determining the optical distance between the measurement planes.

5. A method of estimating one or more optical characteristics of a DUT as in claim 1 wherein the general transverse aberration equations are derived from the general wavefront equation, and the method includes estimating coefficients of the general transverse aberration equations by solving simultaneously equations derived from the general transverse aberration equations.

6. A method of estimating one or more optical characteristics of a DUT as in claim 1 wherein the calculation of at least one of the one or more optical characteristics is by subtracting the estimates of the coefficients for each measurement plane from each other and dividing by the respective distance between the planes.

7. A method of estimating one or more optical characteristics of a DUT as in claim 6 wherein there are more than two planes and the value for the optical characteristic obtained from different plane pairs is averaged to provide a composite estimate.

8. A method of estimating one or more optical characteristics of a DUT as in claim 1 wherein the step of measuring points of intersection of ray and measurement plane includes:

at a first of the planes:
determining a first point or first points of the intersection of the ray or each ray with the first plane without the DUT at the test location;

determining a second point or second points of the intersection of the ray or each ray with the first plane with the DUT in the test location; and, at a second of the planes:
determining a third point or third points of the intersection of the ray or each ray with the second plane without the DUT at the test location;

determining a fourth point or fourth points of the intersection of the ray or each ray with the second plane with the DUT in the test location.

9. A method of estimating one or more optical characteristics of a DUT as in claim 1 wherein the step of determining the transverse aberrations includes calculating a first transverse aberration by subtracting a respective first point from a second point; and, calculating a second transverse aberration by subtracting a respective third point from a fourth point.

10. A method of estimating one or more optical characteristics of a DUT as in claim 1 wherein the step of estimating the coefficients of the general transverse aberration equation includes:

differentiating the general wavefront equation to provide the general transverse aberration equations;

for the first plane:
solving the general transverse aberration equations or simultaneous forms of the general transverse equations for the values of the coefficients using the first point, third point and first transverse aberration of respective rays; and, for the second plane:
solving the general transverse aberration equation or simultaneous forms of the general transverse equations for the values of the coefficients using the first point, third point and second transverse aberration of respective rays.

11. A method of estimating one or more optical characteristics of a DUT as in claim 1 wherein the calculating of at least one of the one or more optical characteristics includes:

subtracting respective coefficients for the first and second planes and dividing by the optical path distance between the first and second planes.

12. A method of estimating one or more optical characteristics of a DUT as in claim 1 wherein the first and second optical path distances are achieved by measuring the ray intersections at two physically spaced transverse planes.

13. A method of estimating one or more optical characteristics of a DUT as in claim 1 wherein an optical slab of known refractive index and thickness is inserted thereby effecting a known alteration in optical path distance without altering the physical plane where the ray intersections are measured.

14. A method of estimating one or more optical characteristics of a DUT as in claim 1 wherein there are a plurality of rays generated and the method is used to determine a number of coefficients of a general wavefront equation.

15. A method of estimating one or more optical characteristics of a DUT as in claim 14 wherein for each ray the coefficients are determined using adjacent rays to enable the simultaneous solution of a number of equations to determine the values of the coefficients.

16. A method of estimating one or more optical characteristics of a DUT as in claim 1 wherein, the wavefront equation is composed of a sum of monomials.

17. A method of estimating one or more optical characteristics of a DUT as in claim 1 wherein the wavefront equation is composed of a sum of Zernike polynomials.

18. A method of estimating one or more optical characteristics of a DUT as in claim 1 wherein the Grant-Schmidt orthogonalisation is used to transform the wavefront equation into one composed of a sum of polynomials that are orthogonal over the data set.

19. A method of estimating one or more optical characteristics of a DUT as in claim 1 wherein regression analysis is used to estimate the coefficients in the wavefront equation.

20. A method of estimating one or more optical characteristics of a DUT as in claim 19 wherein the regression analysis is by least squares estimation.

21. A method of estimating one or more optical characteristics of a DUT as in claim 1 wherein the coefficients in the wavefront equation are estimated by either a grid search, a gradient search or a ravine search.

22. A method of estimating one or more optical characteristics of a DUT as in claim 1 wherein a genetic algorithm is used to establish the best estimate of the coefficients.

23. A method of estimating one or more optical characteristics of a DUT as in claim 1 wherein the DUT is selected from the group selected from a lens, a mirror, a prism or a combination of optics.

24. A method of estimating one or more optical characteristics of a DUT as in claim 1 wherein the optical characteristics are plotted as a map.

25. A method of estimating one or more optical characteristics of a DUT as in claim 1 wherein the method is used to ascertain optical aberrations in the DUT.

26. A method of estimating one or more optical characteristics of a DUT as in claim 1 wherein the method is used to align the DUT and an incident optical wavefront.

27. A method of estimating one or more optical characteristics of a DUT as in claim 1 wherein the DUT includes an optic and the method allows an assessment to be made as to whether the optic suits a particular application.

28. A method of estimating one or more optical characteristics of a DUT as in claim 27 wherein the method is used for testing ophthalmic lenses.

29. An apparatus for estimating an optical characteristic of a DUT including:
   means for directing an optical wavefront, generated by a source, towards a test location;
   ray generation means for generating at least one ray from the wavefront;
   detector means for measuring respective points of intersection of each ray at two of more measurement planes with and without the DUT at the test location, each measurement plane being transverse to the direction of travel of the wavefront, beyond the test location relative to the source, and at different optical path distances; and,
   processing means for calculating the transverse aberration due to the DUT for each ray at each measurement plane, estimating for each measurement plane from the determined transverse aberrations the coefficients of a general transverse aberration equation, the coefficients of which are the product of a combination of optical characteristics and optical distance between the measurement plane and the principal plane of the DUT, and estimating the optical characteristic from the estimates of the coefficients for each plane and the optical distances between respective measurement planes.

30. An apparatus for estimating an optical characteristic of a DUT as in claim 29 wherein the detector means includes a charge coupled device (CCD) camera which is locatable at the measurement planes.

31. An apparatus for estimating an optical characteristic of a DUT as in claim 29 wherein the detector means is a scanning detector.

32. An apparatus for estimating an optical characteristic of a DUT as in claim 29 wherein the detector means is a screen.

33. An apparatus for estimating an optical characteristic of a DUT as in claim 32 wherein the screen is an optically translucent screen, upon which the rays may be projected and is locatable at the measurement planes.

34. An apparatus for estimating an optical characteristic of a DUT as in claim 29 wherein the displayed image on the screen is imaged onto a CCD camera.

35. An apparatus for estimating an optical characteristic of a DUT as in claim 29 wherein the processing means is a computer including interface means for communication with the CCD camera, memory means for storing data and instructions, and output means for provision of results.

36. An apparatus for estimating an optical characteristic of a DUT as in claim 29 wherein the output means is a video display.

37. An apparatus for estimating an optical characteristic of a DUT as in claim 29 wherein the ray generation means includes a Hartmann plate.

38. An apparatus for estimating an optical characteristic of a DUT as in claim 29 wherein the ray generation means includes a movable or scannable aperture.

39. An apparatus for estimating an optical characteristic of a DUT as in claim 29 wherein the ray generation means is located between the light source and the DUT.

40. An apparatus for estimating an optical characteristic of a DUT as in claim 29 wherein the ray generation means may be located between the DUT and the detector means.

41. An apparatus for estimating an optical characteristic of a DUT as in claim 29 wherein the detector means includes means for selective placement of a transparent optical slab of known properties between the DUT and the camera to thereby produce the optical path difference between the measurement planes.

42. An apparatus for estimating an optical characteristic of a DUT as in claim 29 wherein a beam splitter is used to split each ray into at least two and there are two detector means, at different measurement planes to detect the split rays.

* * * * *